Feb. 9, 1971 J. D. RIDGEN ET AL 3,562,664
GAS LASER WITH MEANS FOR MAINTAINING POWER OUTPUT
Filed March 1, 1968
Fig. 1.
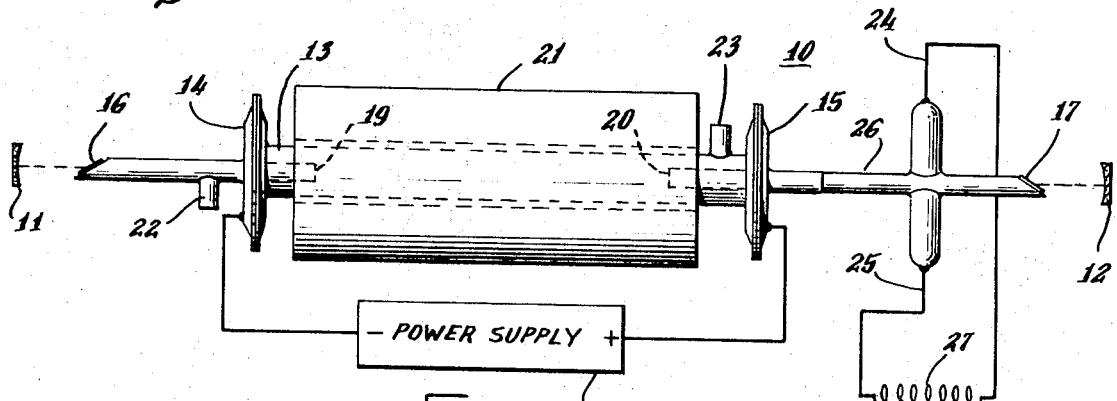
Fig. 2.
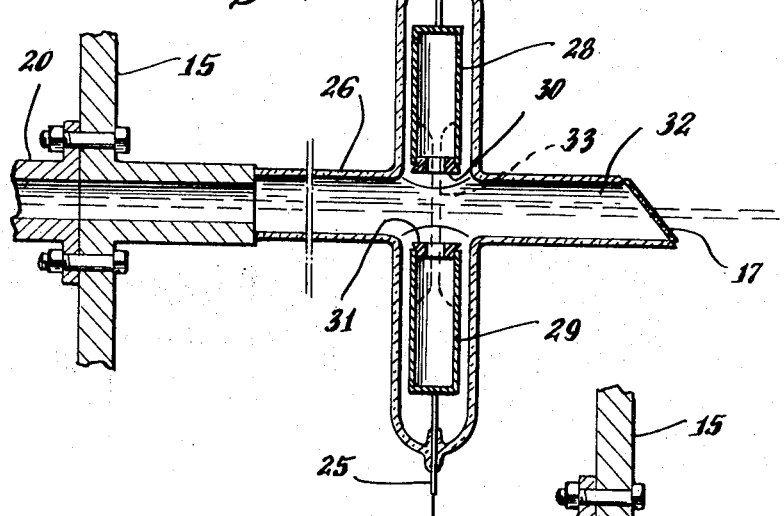
Fig. 4.
Fig. 3.
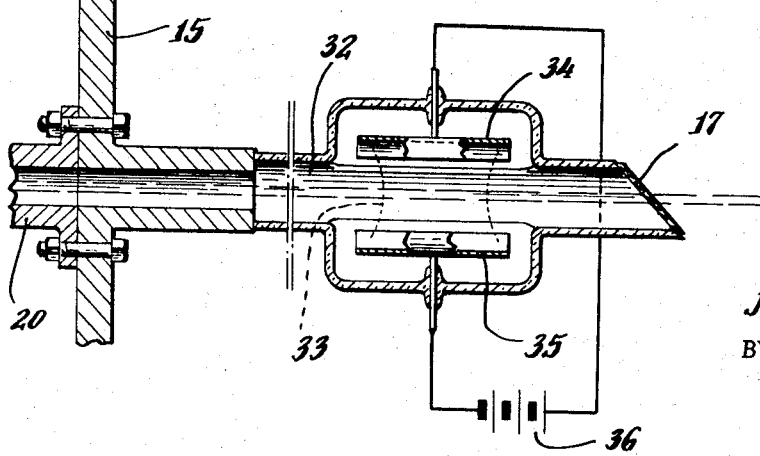
INVENTORS.
Jameson D. Rigden
BY David A. Huchital
Edward D. Murphy
ATTORNEY.

United States Patent Office 3,562,664
Patented Feb. 9, 1971

3,562,664
GAS LASER WITH MEANS FOR MAINTAINING POWER OUTPUT
Jameson D. Ridgen, 14 Clover Lane, Westport, Conn. 06880, and David A. Huchital, 41 Wolfpit Ave., Norwalk, Conn. 06851
Filed Mar. 1, 1968, Ser. No. 709,627
Int. Cl. H01j 61/00; H01s 3/22
U.S. Cl. 331—94.5
14 Claims

ABSTRACT OF THE DISCLOSURE

A gas laser including means for flowing the gas through an optical cavity and means for establishing a discharge within the gas to produce stimulated emission. An auxiliary potential difference is established in the gas enclosure but outside the primary discharge region to prevent the accumulation of absorbing or scattering particles on the windows through which the laser beam is transmitted. The potential difference may be large enough to produce a discharge.

---

This invention relates to lasers of the type utilizing a gaseous discharge to generate coherent electromagnetic radiation, and particularly relates to means for extending the useful lifetime of such lasers.

Many previous gas lasers have been subject to a severe limitation on the length of time for which they can be operated without maintenance. Such lasers have frequently been found to operate satisfactorily for a short period of time and then exhibit a steady decrease in the output power of the laser beam. It is, therefore, the purpose of this invention to provide means for overcoming this difficulty.

Accordingly, it is an object of this invention to provide improved gas lasers having substantially extended operational lifetimes.

Another object of this invention is the provision of novel means for preventing power loss during long-term operation of gas lasers.

It is also an object of this invention to provide new and improved gas lasers which require substantially less frequent maintenance than previous lasers.

Briefly, in accord with one embodiment of this invention, we provide a gas laser of the type comprising a hollow tube containing a supply of gas such as argon within which a discharge is established, for example, by applying a potential difference to a pair of electrodes. Emission of electromagnetic radiation occurs due to the pumping of particles in the gas to a high energy state and the subsequent return of these particles to the normal state. Stimulated emission is achieved by reflection of this radiation within an optical cavity. The tube is sealed by windows which are transparent to the emitted radiation. In accord with this invention, an auxiliary potential difference is established at a location in the tube which is between the active region and one of the windows. The field may be provided adjacent either the anode or the cathode or both, as required; it may be AC or DC, and it may be induced or directly applied by electrodes in the tube. The direction of the field may be either transverse to the optical axis or aligned with it. The field may be sufficiently high so as to produce a discharge although this is not necessary. Such a field has been found to be effective in preventing power loss during a substantially longer period of operation.

The novel features believed characteristic of the invention are set forth in the appended claims. The invention itself, together with further objects and advantages thereof may best be understood by reference to the following description taken in conjunction with the appended drawing in which:

FIG. 1 is a perspective view of a gas laser in accord with the present invention;

FIG. 2 is a cross-sectional view of a portion of FIG. 1;

FIG. 3 is a cross-sectional view of an alternative embodiment of this invention; and FIG. 4 is a cross-sectional view of another embodiment of this invention.

In FIG. 1, a gas laser 10 is illustrated comprising a pair of mirrors 11, 12 which define a resonant optical cavity, and a hollow glass tube 13 closed by metallic end members 14 and 15 and windows 16 and 17 which contain a gas within the cavity. A power supply 18 provides a potential difference between cathode 19 and anode 20 to establish a primary discharge within the tube. A magnet 21 is also provided to confine the discharge to a narrow path. The particular laser illustrated is an inert gas laser of the type utilizing a hollow cathode through which a continuous flow of gas is provided. Such a laser is more completely described and claimed in our co-pending application, Ser. No. 656,157, filed July 26, 1967, and assigned to the assignee of this invention, the specification of which is incorporated herein by reference. In accord with this construction, the laser 10 also includes a gas inlet 22 and outlet 23 to provide for the flow of gas therethrough. The present invention is particularly useful in lasers of this type; however, it is also intended to be used in conjunction with other gas lasers.

In accord with one embodiment of the present invention, an additional pair of electrodes 24 and 25 are mounted in an extension 26 of the enclosure and an appropriate power source such as a transformer 17 is connected to them. The primary of the transformer may be connected to any AC source such as the line voltage. These electrodes produce a discharge transverse to the optical axis of the cavity. The detailed construction and the function of these electrodes is mode clearly illustrated in FIG. 2. As shown therein, the electrodes 24 and 25 comprise metallic cylinders or cans 28 and 29, the ends of which are protected against sputtering damage due to ion bombardment by an overlying layer of insulating material 30, 31. For example, the cylinders may be aluminum and the insulating material may be aluminum oxide. The electrodes are mounted in juxtaposition across the optical axis of the laser so that the beam of radiant energy 32 passes between them and is intersected by the transverse discharge 33 which extends between the electrodes. The voltage applied may be on the order of 1000 volts.

We have found that provision of means for establishing a transverse discharge in a gas laser is effective to greatly increase the operational lifetime of the laser. Specifically, we have found that conventional gas lasers, which lack the discharge means of this invention, produce particles and permit these particles to collect on the surface of the window which completes the gas enclosure while providing for transmission of the emitted radiation. In FIGS. 1 and 2, this member is the glass window 17, commonly referred to as the Brewster window because it is mounted at the Brewster angle which permits maximum transmission. During operation of the laser, particles continuously collect on the inner surface of this window, and the layer thus built up absorbs or scatters more and more of the radiant energy which attempts to pass through it. In a relatively short time, this causes a noticeable decrease in the power output of the laser, and finally the laser power is so low that operation must be terminated while the window is cleaned. In accord with the present invention, we have found that the provision of an auxiliary field within the laser prevents the build-up of this layer and maintains the inner surface of the window in a clean condition, practically indefinitely. As a specific example, an argon laser which previously required dismantling and cleaning after every twenty hours of operation has been operated continuously for several hundred hours with transverse electrodes such as those shown in FIG. 2 installed. There has been no noticeable decrease in the power output.

The precise theoretical explanation for the effect of the field is not known with certainty; however, it appears that window which completes the gas enclosure while providing either the field is effevtive to discharge charged particles which are moving toward the window so that, even though they may reach it, they no longer adhere to it, or else the field actually prevents particles from moving toward the window by collecting them on or near the electrodes 24 and 25 or on the adjacent tube wall. Regardless of the explanation, however, the present invention is directed to the novel concept of providing a field adjacent the window to prevent the absorbing or scattering layer from developing. In general, it has been found that this effect is most severe at the window adjacent the anode of the primary discharge; accordingly it is preferred that the field be established adjacent the anode end of the tube. However, such a discharge may also be provided adjacent the cathode window if necessary.

The transverse AC discharge of FIGS. 1 and 2 is preferred because it can be simply and inexpensively produced and, at the same time, it is effective to prevent the power loss. However, other means of producing a field have also been found to be effective. For example, a discharge induced by an external current may be used. In either case, the field may be so small that no discharge occurs; for example, fields on the order of a few hundred volts do not cause a discharge in the inert gas laser of FIG. 1 but the power loss does not occur. Also, it is not critical that the field be transverse to the optical axis; a field coaxial with the output beam may be more convenient in some cases.

FIG. 3 illustrates an alternative embodiment of this invention wherein the cylindrical electrodes of FIG. 2 are replaced by an extended pair of semi-cylindrical electrodes 34 and 35. As in FIG. 2, the leading edge of these electrodes may be covered by an insulating layer to prevent sputtering. The electrodes 34 and 35 are connected to a DC power supply 36. In this embodiment, the extra space required by the electrodes for the auxiliary field is in the direction of the length of the laser tube rather than transverse to it. The axial extension of these electrodes maintains the efficiency of the transverse discharge and the additional length is small relative to the overall length of the cavity. It is noted, however, that the configuration of the electrodes is not basic in significance to this invention.

FIG. 4 illustrates another alternative embodiment wherein a coil 37 is disposed adjacent to the exterior of the laser tube and connected to an AC source. Since this arrangement induces a transverse field across the beam of radiant energy within the laser tube, it is also effective in preventing particle collection on the window 17. Other arrangements of an external coil may also be used; for example, a coil may be wrapped coaxially around a portion of the laser tube adjacent the window 28 if desired.

It will be clear from the foregoing description that the essence of this invention is directed to the provision of an auxiliary field which intersects the axis of the laser at a point beyond the active region of the primary discharge to prevent the collection of particles on the window at the end of the gas enclosure. The orientation of the field and the means by which it is established may take any suitable configuration; it is only significant that the radiant energy beam and the auxiliary field intersect at some point so that particles entrained in the path of the radiant energy beam can be acted on by the discharge. Accordingly, it will be appreciated that many changes and modifications may be made without departing from this invention in its broader aspects. We, therefore, intend the appended claims to cover all such changes and modifications as fall within the true spirit and scope of this invention.

We claim:

1. In a laser of the type including a resonant optical cavity, means for enclosing a gas within said cavity, means for establishing a primary discharge within said means to produce stimulated emission of radiation and gas to produce stimulated emission of radiation and means for permitting transmission of said radiation from said cavity, the improvement comprising means for establishing a potental difference transverse to the optical axis of said cavity within said enclosure and outside the region of said primary discharge.

2. A laser as claimed in claim 1 wherein said means for establishing potential difference comprises an electric field and wherein said field at least intersects the optical axis of said cavity to affect charged particles traveling parallel to said axis and passing through said electric field.

3. A laser as claimed in claim 1 wherein said potential difference is established adjacent the high potential end of said primary discharge.

4. A laser as claimed in claim 1 wherein said potential difference is established adjacent the low potential end of said primary discharge.

5. A laser as claimed in claim 4 and including a second potential difference established adjacent the high potential end of said primary discharge.

6. A laser as claimed in claim 1 wherein said potential difference is sufficient to produce a discharge to occur in said gas.

7. A laser as claimed in claim 1 wherein said potential difference is less than that required to produce a discharge.

8. A laser as claimed in claim 1 wherein part of said potential difference is parallel to the optical axis of said cavity.

9. A laser as claimed in claim 1 wherein said potential difference is of alternating polarity.

10. A laser as claimed in claim 1 wherein said potential difference is of constant polarity.

11. A laser as claimed in claim 1 wherein said means for establishing a potential difference comprises an induction coil mounted adjacent the exterior of said enclosure.

12. A laser as claimed in claim 1 wherein said means establishing a secondary discharge comprises a pair of electrodes mounted inside said enclosure.

13. A gaseous laser as claimed in claim 1, wherein each of said electrodes comprises a cylindrical metallic member having an open end thereof directed towards the other of said electrodes, said open end being protected by a layer of insulating material.

14. The gaseous laser as claimed in claim 1 wherein each of said electrodes comprises a semi-cylindrical metallic member positioned so that the axis of said semi-cylinder is parallel with the axis of said optical cavity.

References Cited

UNITED STATES PATENTS

| | | | |
|---|---|---|---|
| 2,016,437 | 10/1935 | Jones | 176—126 |
| 3,334,314 | 8/1967 | White | 331—94.5 |
| 3,394,320 | 7/1968 | Medicus | 331—94.5 |
| 3,396,301 | 8/1968 | Kobayashi et al. | 331—94.5 |
| 3,464,025 | 8/1969 | Bell | 331—94.5 |

RONALD L. WIBERT, Primary Examiner

R. J. WEBSTER, Assistant Examiner

U.S. Cl. X.R.

316—1, 2

UNITED STATES PATENT OFFICE

CERTIFICATE OF CORRECTION

Patent No. 3,562,664            Dated February 9, 1971

It is certified that error appears in the above-identified patent and that said Letters Patent are hereby corrected as shown below:

In the headings, on the cover page and in column 1, change the spelling of the name of the first-named inventor from "Ridgen" to --Rigden--.

Signed and sealed this 17th day of August 1971.

(SEAL)
Attest:

EDWARD M. FLETCHER, JR.           WILLIAM E. SCHUYLER, JR.
Attesting Officer                   Commissioner of Patents